INVENTORS.
Ralph E. Cross.
Herbert A. Martens.
BY
Barnes, Dickey & Pierce
ATTORNEYS

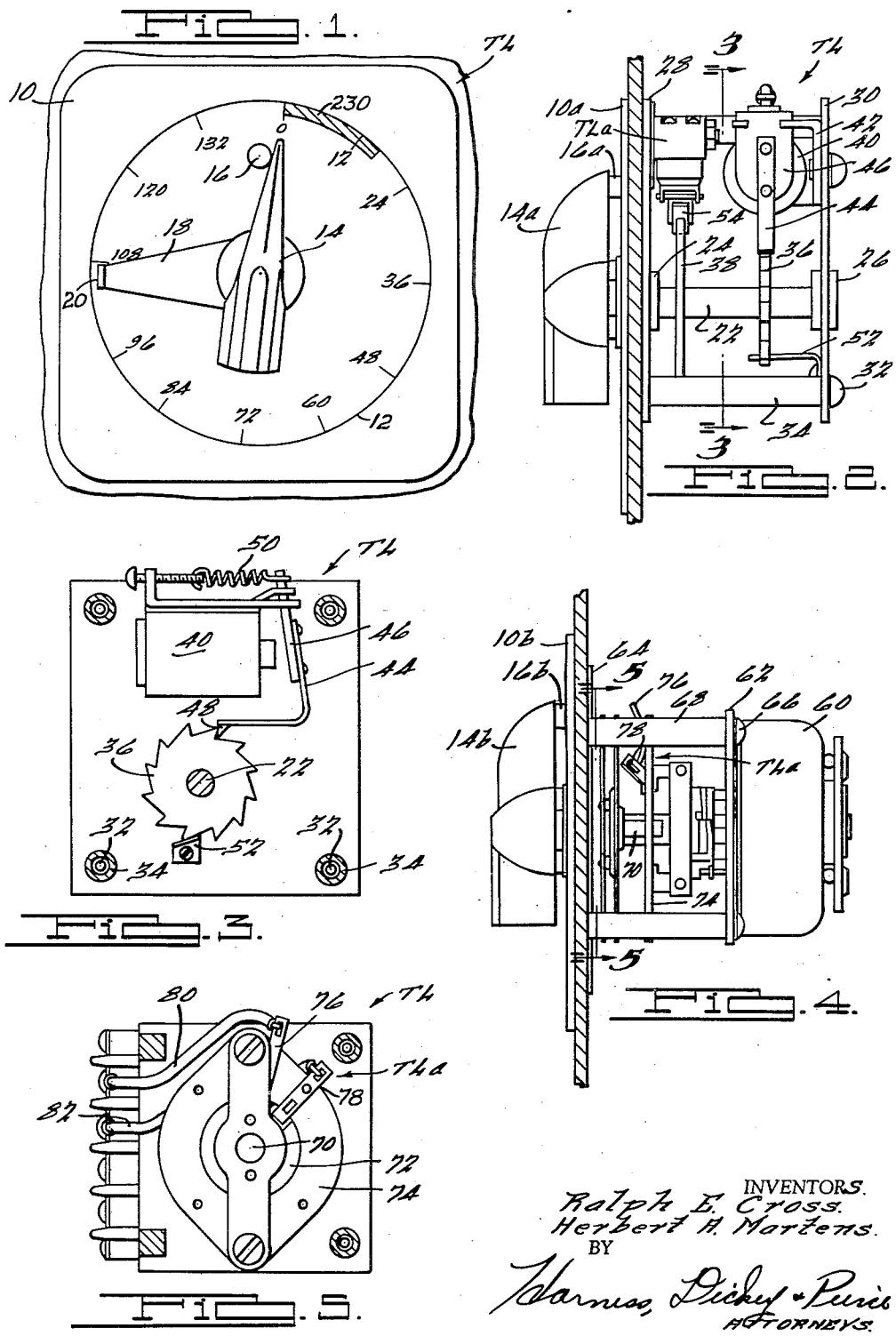

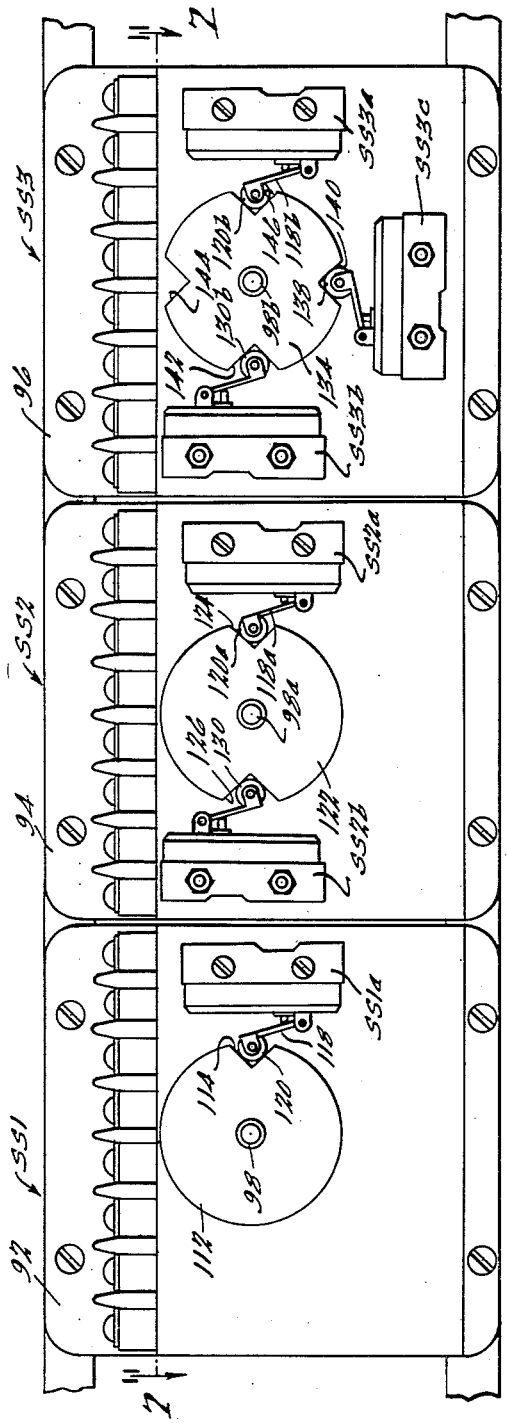

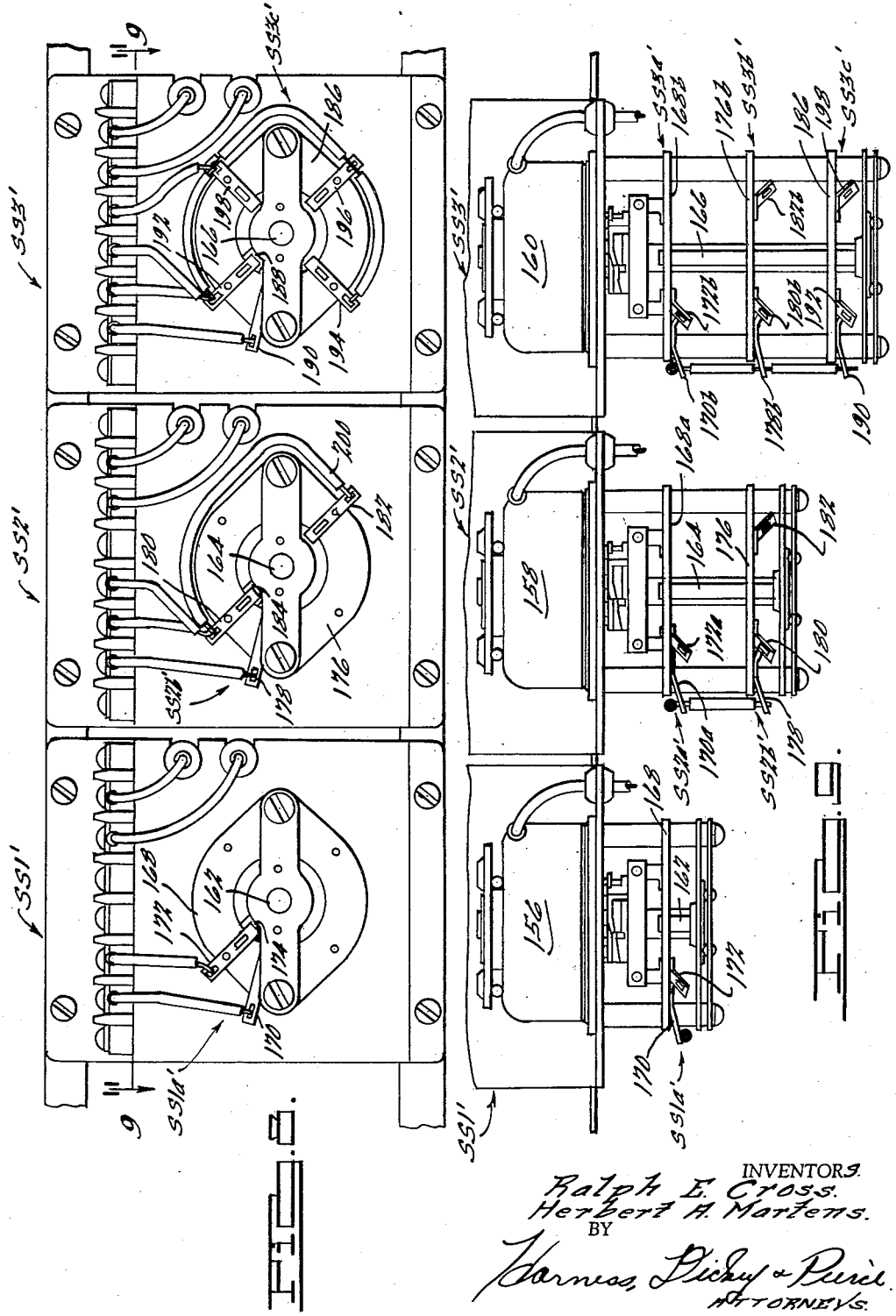

United States Patent Office 2,963,695
Patented Dec. 6, 1960

2,963,695

MACHINE CONTROL UNIT

Ralph E. Cross, Grosse Pointe Shores, and Herbert A. Martens, Birmingham, Mich., assignors to The Cross Company Filed Nov. 28, 1956, Ser. No. 624,835

5 Claims. (Cl. 340—267)

This invention relates to machine control equipment and more particularly to equipment for facilitating effective control of the condition of the cutting tools of automatic, multiple-station machine tools.

An automatic, multiple-station machine tool commonly includes a plurality of machines each of which has one or more metal-cutting tools. In the customary arrangement, work operations are performed upon the work pieces at each such machine, with the work pieces being indexed, by a conveyor or transfer mechanism, to the several machines in sequence. The completion of the work operations at all stations is usually imposed as a condition precedent to the indexing of the work pieces to the next succeeding stations.

The quality and the quantity of the output products from such a multiple-station machine tool are controlled to a significant extent by the condition of the cutting tools. Tools that have become dull produce inferior cuts and tools that have worn to the point of losing size tend to produce cuts exceeding the established dimensional tolerances.

The quantity of work pieces which can be processed by an automatic machine tool will be determined by the effective operating time of the machine, that is by the amount of time in any operational period during which the machine is operative and not shut down for maintenance or repair. The effects of dull or worn cutting tools, and the time required to change those tools, constitute a substantial portion of the total down time of modern automatic machines. If the machine is not shut down to replace each cutting tool as it becomes dull, it is to be expected that total down time will increase, since dull tools are much more likely to break and since the use of dull tools tends to produce overloading, wear and failure of the machine.

A reduction of down time may therefore be accomplished by following a practice of replacing each cutting tool as it becomes dull, and minimization of down time can be achieved by replacing the cutting tools on a fully systematic basis.

Equipment adapted to reflect the state or condition of the cutting tools, to signal the attainment of a degree of dullness necessitating tool replacement, to indicate when the cutting tools are approaching that degree of dullness, and to shut down the machine, if desired, when any cutting tool requires replacement is disclosed in Patent 2,679,038 granted May 18, 1954, and the present invention relates to the improvement of the equipment which is the subject matter of that patent. The improvement lies in simplification, in reduction of production and maintenance costs, and in increased insurance against malfunctioning.

The nature of the invention, and its objects and features, may be understood from the following detailed description of embodiments of the invention when read with reference to the accompanying drawings in which:

Figure 1 is a front elevational view of an indicating mechanism embodying certain of the principles of the present invention;

Figure 2 is a side elevational view of the equipment represented in Fig. 1;

Figure 3 is a vertical sectional view taken substantially along the line 3—3 of Fig. 2;

Figure 4 is a side elevational view of a modified form of the equipment represented in Figs. 1-3;

Figure 5 is a sectional view taken substantially along the line 5—5 of Fig. 4;

Figure 6 is an elevational view of a stepping mechanism including a bank of stepping switches embodying certain of the principles of the present invention;

Figure 7 is a sectional view taken substantially along the line 7—7 of Fig. 6;

Figure 8 is an elevational view of a modified form of the equipment represented in Fig. 6;

Figure 9 is a sectional view taken substantially along the line 9—9 of Fig. 8; and, Figure 10 is a schematic representation of a suitable control circuit in which the equipment of Figs. 1 to 9 may be incorporated to perform, in association with the machine tool, the desired indicating and/or control functions.

Figure 10:
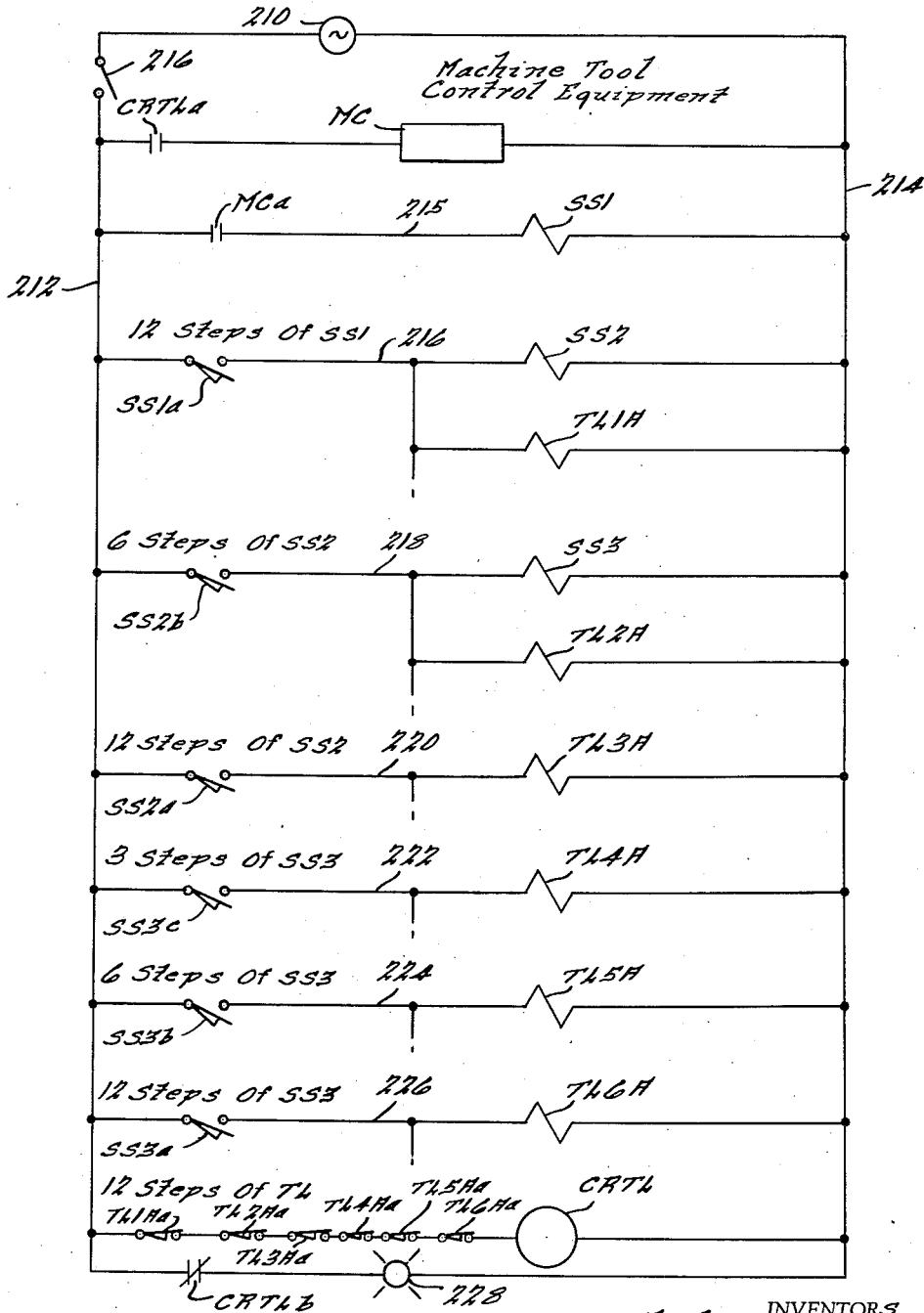

Preliminary to the placing of the machine tool in full production, the expected life of each cutting tool is determined either from past experience or from observation during initial runs. The tool life expectancy is preferably cast in terms of numbers of machine cycles (whether the cutting tool is used once or more than once during each such cycle), and represents when the tool should be replaced to insure that it will not reach a point of dullness at which inferior work pieces will be produced, at which the possibility of tool breakage increases, or at which the tool has become so worn as to greatly complicate sharpening. In practice it will be found that the expected life of a group of different cutting tools in a single automatic machine will vary greatly from one another, but that the expected life of any one cutting tool, and of its replacements, can be determined with substantial accuracy.

An indicating mechanism of the type represented in Fig. 1 of the drawings is provided for each cutting tool or for each group of cutting tools having the same life expectancies. The indicator TL includes a plate 10 to which is secured a dial 12 circumferentially inscribed with appropriate indicia preferably in the form of numerical representations of the number of machine cycles, such as is representatively shown in Fig. 1. A manually settable pointer 14 is rotatably supported upon the face of the unit in position to cooperate with the indicia upon the dial 12. A stud 16 is positioned to serve as a fixed zero stop, limiting counterclockwise movement of the pointer 14 and an arm 18, mounted for frictional rotation, is provided with an upstanding end portion 20 adapted to serve as an adjustable stop to clockwise movement of pointer 14. At the beginning of operations, arm 18 is set in accordance with the determined data as to the expected life of the cutting tool or tools with which the indicator is associated in terms of machine cycles and the pointer 14 is rotated in a clockwise direction until it engages stop 20. Means to be described are then effective to advance the pointer 14 in a counterclockwise direction toward and eventually into engagement with zero stop 16.

The elevational view of Fig. 1 is intended to represent that view of both the equipment represented in Figs. 2 and 3 and the modified equipment represented in Figs. 4 and 5, so that distinguishing suffixes are added to those reference characters in Figs. 2 to 5 which also appear on Fig. 1.

In the arrangement of Figs. 2 and 3, the pointer 14a is mounted upon a shaft 22 rotatably supported in bearings 24 and 26 mounted in forward and rear plates 28 and 30, respectively, those plates being maintained in spaced parallelism by machine screws 32 and spacers 34.

A ratchet 36 and a cam 38 are keyed to shaft 22. A solenoid 40 is mounted by means of a bracket 42 upon plate 30. A flexible extension 44, secured to the armature 46 of solenoid 40, carries a pawl 48 engageable with the teeth on ratchet 36. When solenoid 40 is energized, pawl 48 is moved to advance the ratchet 36 one step in a counterclockwise direction in the view of Fig. 3. When solenoid 40 is deenergized, armature 46 is returned to its shown position by spring 50, bringing pawl 48 into engagement with the next succeeding tooth on ratchet 36. A detent 52 is positioned to prevent clockwise rotation of ratchet 36 under the forces exerted by pawl 48 during the return motion of armature 46. However, detent 52 is sufficiently elongated and flexible, as is illustrated in Fig. 2, so that ratchet 36 can be rotated in a clockwise direction manually when pointer 14a is reset.

Cam 38 cooperates with a cam follower 54 at the tip of the actuating lever of sensitive switch TLa. Switch TLa, mounted upon plate 28, may include either normally opened or normally closed contacts and cam 38 may be primarily circular with a single discontinuity which may be either an indentation or a lobe. However, in the illustrated arrangement it is assumed that the switch TLa is provided with a pair of electrical contacts which are opened when the actuating lever is released, and that cam 38 is provided with a single indentation so that the contacts of switch TLa are closed under all circumstances except when cam 38 is turned to one preselected discrete position. That position, in the preferred arrangement, is when pointer 14a is at the zero position.

In the disclosed unit, ratchet 36 is provided with twelve teeth so that pointer 14a will be moved in 30° increments from whatever position it is initially set to the zero position.

In the alternative arrangement disclosed in Figs. 1, 4 and 5, the indicating unit TL includes a rotary solenoid 60 supported upon a plate 62 which is supported in spaced parallelism with a plate 64 by means of machine screws 66 and spacers 68. Rotary solenoid 60, which is a conventional unit available on the market, drives a shaft 70 in a counterclockwise direction in the view of Fig. 5, one step for each energization of that solenoid. It is assumed, for illustration, that the solenoid drives the shaft 70 one full revolution in twelve steps. Shaft 70 in turn drives a unit similar to a wafer type band switch. Thus, a movable contactor 72 is mounted upon and rotated by shaft 70 relative to an insulator 74. A pair of contact elements 76 and 78 is mounted upon the insulator 74 with, representatively, a 30° spacing between those contacting elements. Rotatable contactor 72 is metallic and bridges elements 76 and 78 under all circumstances except that illustrated in which contacting element 78 (which is shorter than contacting element 76) is aligned with an opening or an insulated segment in contactor 72, this condition occurring at the zero position or zero setting of the unit. Consequently, output conductors 80 and 82 will be interconnected under all conditions except the zero setting of the unit. The switch comprising elements 72, 76 and 78 is designated TLa.

The stepping mechanism, in the form illustrated in Figs. 6 and 7, includes a pawl and ratchet driving unit driving a cam and cam follower switch unit, in the nature of the practice followed in the indicator unit of Figs. 2 and 3, while the stepping mechanism of Figs. 8 and 9 follows the Figs. 4 and 5 practice of driving wafer-type switches with a rotary solenoid. It is also contemplated, among other possible modifications, that a pawl and ratchet drive unit may be associated with a wafer-type switch and that a rotary solenoid may be associated with a cam and cam follower switching mechanism.

In the forms disclosed in Figs. 6 and 7, the stepping mechanism comprises three units SS1, SS2 and SS3 mounted upon plates 92, 94, and 96, respectively. While plates 92, 94 and 96 are shown to be interjointed, there is no direct mechanical cooperation among the units and they may be disposed in any appropriate position relative to one another.

Unit SS1 comprises a shaft 98 supported upon plate 92 by bearing means 100. A ratchet 102, representatively having twelve teeth, is keyed to shaft 98 at one side of plate 92 in a position to be driven by a pawl associated with the extension 104 of the armature 106 of a solenoid 108, reverse rotation of ratchet 102 during the return movement of armature 106 being prevented by a detent spring 110. It will be perceived that the construction is very similar to that employed in the indicating mechanism shown in Figs. 2 and 3. Similar driving mechanisms are employed in units SS2 and SS3.

At the other side of plate 92, shaft 98 carries a cam 112, keyed thereto, the circumference of which is circular except for a single indentation 114 at one point thereon. A sensitive switch SS1a is provided with an actuating arm 118 carrying a roller type cam follower 120 continuously riding on the periphery of cam 112. At one position of the equipment, the zero position, cam follower 120 is in engagement with the notch 114 and during that condition, in the representative arrangement disclosed, the electrical contacts of switch SS1a become closed, those contacts being open at each of the other eleven steps of the unit 86.

Shaft 98a, a constituent element of unit SS2, is rotated by a driving mechanism similar to that of unit SS1 and carries, at the other side of plate 94, a first cam 112a cooperating with a switch SS2a identical to that of unit SS1, cam 112a being provided with a single indentation at the zero point, at which the contacts of switch SS2a are closed. Shaft 98a additionally carries a second cam 122 keyed thereto, that cam having indentations at two diametrically opposed points 124 and 126. A second switch SS2b is supported upon plate 94 and the cam following roller 130 thereof is disposed to engage the periphery of cam 122 so that its contacts will be closed twice during each full revolution of cam 122, that is, with the zero and No. 12 positions coinciding, the contacts of switch SS2b will be closed at the No. 0 and No. 6 stepping positions.

Unit SS3 is identical to unit SS2 except that it is provided with an additional cam 134 secured to the shaft 98b cooperating with sensitive switch SS3c actuated through a cam follower 138 engageable with the periphery of cam 134. Cam 134 is provided with four notches on its periphery, notches 140, 142, 144 and 146. These notches are so disposed and the cam 134 is so oriented that the contacts of sensitive switch SS3c are closed at the No. 0 (and hence No. 12), No. 3, No. 6 and No. 9 steps during the twelve step movement of the mechanism.

The modified arrangement illustrated in Figs. 8 and 9 performs the functions of the arrangements of Figs. 6 and 7 employing the constructional techniques previously described in connection with the indicator mechanism illustrated in Figs. 4 and 5. Thus, each of the three units SS1′, SS2′ and SS3′ includes a stepping type rotary solenoid 156, 158 and 160, respectively, for driving the shafts 162, 164 and 166, respectively, a full rotation in twelve equal steps. Shaft 162 carries a wafer 168 having two contacting elements 170 and 172 one of which, element 170, continuously engages a metal portion of a rotor carried by shaft 162 and the other of which is selectively engageable with a metallic projection 174 on that rotor so that elements 170 and 172 are bridged or interconnected only at one position, the No. 0 or No. 12 position in the stepwise movement of the rotatable elements of the unit. The switch including elements 170 and 172 is identified as with SS1a'. Unit SS2' is provided with an identical wafer, labeled wafer 168a cooperating with contacting elements 170a and 172a in the same fashion as above described in connection with unit SS1', and further carries an additional wafer 176 having one contacting element 178 continuously engaging a rotatable metallic rotor driven by shaft 164 and two additional contacting elements 180 and 182 selectively connectable to contacting element 178 by engagement with metallic lug 184 carried upon the rotatable element. Contacting element 178 is connected with contacting element 180 at the No. 0 or No. 12 position of the unit and with element 182 at the No. 6 rotational position. Unit SS3' is similarly provided with a first band including wafer 168b corresponding with wafer 168 and its cooperating elements in units SS1' and SS2', with a second band including wafer 176b similar to wafer 176 and its cooperating elements in the unit SS2', and is further provided with a wafer 186, a metallic rotor including projection 188, contacting element 190 continuously engaging the rotor and contacting elements 192, 194, 196 and 198 selectively connectable to element 190 by engagement with lug 188. Contacting elements 192, 194, 196 and 198 are connected to contacting element 190 at the No. 0 (or No. 12), No. 3, No. 6 and No. 9 positions, respectively, of rotation of shaft 166.

To correlate the functioning of the units of Figs. 8 and 9 with that of the units 6 and 7, contacting elements 180 and 182 in unit SS2' are interconnected by a conductor 200, the elements associated with wafer 176 constituting a switch SS2b', and contacting elements 180b and 182b in unit SS3 are similarily interconnected so that the switch band including wafer 176, as well as the switch band including wafer 176b is adapted to complete a circuit twice each revolution of those units. The elements associated with wafer 176 constitute a switch SS2b' and those with wafer 176b constitute a switch SS3b'. Similarily, contacting elements 192, 194, 196 and 198 in unit SS3' are electrically interconnected so that a single circuit associated with the band including wafer 186 will be closed four times each full revolution of the unit, that is, at the Nos. 0, No. 3, No. 6 and No. 9 positions, constituting a switch SS3c'.

The circuit of Fig. 10 is presented to demonstrate the preferred electrical cooperation of the previously described elements with the machine tool and its controlling equipment. A source of energy 210 is connectable between conductors 212 and 214 by switch 216. With contacts CRTLa closed in a manner to be described, the voltage between conductors 212 and 214 is applied across the machine tool control equipment MC. This control equipment may be any suitable type. As above described, it is assumed, as an example, that the machine tool control equipment MC is adapted for association with a multiple-station machine tool including conveyor or transfer means for successively indexing the work pieces down the line of stations, one or more cutting tools being brought into operation at each such station. The control equipment, in addition to other functions, controls that conveyor or transfer means, advancing the work pieces only after the work operations at all the stations are completed as determined either on a time or on an event basis. A full machine cycle therefore constitutes the movement of the work pieces from one station to the next station, and the performance and completion of the work operations at those stations. In the manner well known in the art, the machine tool control equipment MC at a preselected point in each machine cycle momentarily closes contacts MCa. Thus, for example, in a machine tool having a reciprocating transfer bar which advances to transfer the work pieces and then retracts to an initial position preparatory to reengaging the work pieces and advancing them again, a limit switch may be disposed to be actuated by that transfer mechanism either at the advanced or return end of its stroke. As will be perceived, the duration of the closure of contacts MCa is not significant so long as they are opened and closed once each machine cycle.

Contacts MCa control directly or indirectly stepping switches SS1, SS2 and SS3. These stepping switches are illustrated in Fig. 10 as having an energizing winding and one or more normally opened contacts (bearing the same reference character as the winding with which they are associated but with a distinguishing literal suffix). These stepping switches may be either the units disclosed in Figs. 6 and 7 of the drawings or the units disclosed in Figs. 8 and 9 of the drawings.

Considering the operation of the circuit of Fig. 10 from the standpoint of those elements, at each closure of contacts MCa, winding SS1 is energized to step its shaft 98 or 162 one step. If the equipment is initially in the condition represented in Figs. 6 to 9 of the drawings, then all of the contacts SS1a, SS2a, SS2b, SS3a, SS3b and SS3c will be initially closed so that at the first energization of winding SS1, contacts SS1a will be opened. The opening of contacts SS1a will deenerigze the winding of the second unit SS2 to prepare that unit for stepping. The reopening of contacts MCa during the course of the machine cycle will deenergize winding SS1 to prepare the solenoid including that winding to again advance. At the next machine cycle, winding SS1 will again be energized to advance the first unit to its No. 2 position, producing no change in the condition of contacts SS1a. In that manner, winding SS1 is energized once during each machine cycle, progressively stepping the first unit. At the twelfth step, under the assumed arrangement, contact SS1a is closed to apply the voltage at conductor 212 to conductor 216, so as to energize winding SS2 which causes contacts SS2a and SS2b to be opened. Thus, for example, referring to unit SS2 in Figs. 6 and 7, the first step of rotation of shaft 98a will cause cam followers 120a and 130 to ride out of the notches in cam 122, opening the contacts of switches SS2a and SS2b. At the thirteenth machine cycle, switch SS1a will be opened to deenergized winding SS2 and at the twenty-fourth machine cycle switch SS1a will again be closed to reenergize winding SS2 to set the shaft controlled thereby to its second position. On the sixth such energization of winding SS2, contacts SS2b will be closed, that is, contacts SS2b will close at the seventy-second machine cycle (and each seventy-two machine cycles thereafter). The closure of switch SS2b connects conductor 212 to conductor 218, energizing winding SS3 to step the shaft controlled thereby one step. At each twelfth energization of winding SS2, contacts SS2a are closed to connect conductor 212 to conductor 220. Since contacts SS2a are closed at the twelfth energization of winding SS2, and since winding SS2 is energized at each twelfth energization of winding SS1, switch SS2a will be closed once during each 144 machine cycles.

Switches SS3c, SS3b and SS3a are closed each three steps, each six steps, and each twelve steps, respectively, of the stepping switch mechanism including winding SS3. Since winding SS3 is energized each 72 machine cycles, as above noted, the voltage on conductor 212 is applied to conductor 222 each 216 machine cycles, is applied to conductor 224 each 432 machine cycles and is applied to conductor 226 each 864 machine cycles.

The stepping mechanism disclosed in Figs. 6 and 7 or 8 and 9, the operation of which is above described, may be considered as common equipment adapted to be shared by all of the indicating and control mechanisms TL, one of which is shown in Figs. 1, 2 and 3 or in Figs. 1, 4 and 5. One of those indicating and control mechanisms is associated with each cutting tool in the machine tool or, if desired, one such indicating mechanism may be shared by a plurality of cutting tools having the same expected life in terms of machine cycles, appropriate information being presented to the workmen that all of the cutting tools the condition of which is reflected by the one indicating mechanism should be changed when that mechanism so indicates.

In the illustrative arrangement disclosed, the indicating mechanisms are designed to make a full circle of rotation in response to twelve input pulses to the windings of their solenoids. Consequently each pointer 14 will advance one-twelfth of the full circular distance (that is, 30°) at each input pulse to the winding of its solenoid, defining twelve positions upon the dial 12. Since the No. 0 and No. 12 positions coincide, the pointer 14 will actually step, in this shown arrangement, betweenn twelve discrete positions, that is, from position No. 11 down to position No. 0. There will, of course, be but eleven discrete steps or movements in the rotation of the pointer 14 from the No. 11 to the No. 0 position, so that the pointer 14 will be rotated from its maximum setting to zero in response to eleven input pulses, in the illustrated arrangement. If one of the indicator mechanisms TL is connected between conductions 215 and 214, in parallel with winding SS1 in Fig. 10, it will be stepped one position at each machine cycle and would be stepped from its maximum setting, No. 11, to zero to open the contacts TLa (Figs. 1 to 5) controlled thereby in eleven cycles of the machine tool. No indicator mechanism is illustrated in that position in Fig. 10 since cutting tools may customarily be expected to have longer life expectancies than this, although it is possible that in some machine tool operations, a single cutting tool will be used a large number of times during each machine cycle so that the possibility of the connection is noted.

If the winding of solenoid 40 or rotary solenoid 60 in the tool condition indicator mechanism TL is connected between conductors 216 and 214, that solenoid will be actuated each twelfth machine cycle. The energizing winding of one such tool condition indicating mechanism, designated TL1A, is illustrated in Fig. 10 of the drawings and it will be apparent that other such mechanisms may be connected in parallel with unit TL1A between conductors 216 and 214 if desired. If unit TL1A is set to its maximum position, that is, to its No. 11 position, it will open its contacts TL1Aa at the 132nd machine cycle. If, on the other hand, it is set to its No. 10 position, it will open its contacts TL1Aa at the 120th machine cycle to occur after the time at which it is set. Therefore, the dial may be calibrated in the manner illustrated in Fig. 1, in 30° and 12-cycle increments, running from zero to 132. The dials of tool condition mechanisms connected to conductors other than conductors 216 will be otherwise calibrated.

Any tool condition indicating mechanism connected between conductors 218 and 214, as for example, the winding designated TL2A, will be advanced one step each 72 machine cycles and will turn from its maximum setting to open its contacts TL2Aa at the end of 792 cycles. A tool condition indicating mechanism such as mechanism TL3A connected between conductors 220 and 214 will be indexed one step each 144 machine cycles and will advance from its maximum setting to its zero position to open its contacts TL3Aa at the end of 1684 machine cycles; machine tool indicating mechanism TL4A or other such mechanisms connected in parallel therewith, will be indexed one step each 216 machine cycles and will have a maximum setting of 2376 machine cycles. Mechanism TL5A connected between conductor 224 and conductor 214 will be advanced one step each 432 machine cycles and will be capable of indicating a maximum of 4752 machine cycles, while indicating mechanism TL6A will be advanced one step each 864 machine cycles and will be moved from its No. 11 to its No. 0 positions in 9504 machine cycles.

It will, of course, be appreciated that none of the tool condition indicating mechanisms need be set to their maximum positions, arm 18 being provided to serve as an adjustable maximum limit stop so that fewer numbers of machine cycles may be selected if desired. It will also be apparent that the dials may be otherwise calibrated if desired, including the modification of each of the machine-cycle indicia by the number of times that the cutting tool is employed during each machine cycle if the mechanism is associated with a tool having plural intracycle operations. It will also be appreciated that the tool condition indicating mechanisms may complete one rotation in more or less than twelve steps and that a base other than twelve may be used for the counting or stepping mechanism if desired.

The several contacts including illustrated contacts TL1Aa to TL6Aa controlled by the illustrated tool condition indicating mechanisms are connected in series with the winding of a control relay CRTL between conductors 212 and 214. The opening of any one of those contacts will therefore deenergize relay CRTL. Relay CRTL, in releasing, closes its normally closed contacts CRTLb to energize visible or audible signaling means 228 and opens its normally opened contacts CRTLa to disable the machine tool control equipment MC, stopping operation of the machine tool. This condition occurs when any one of the pointers 14 arrives at its zero position. The operator then scans the several dials 12 to ascertain which cutting tool or cutting tools require replacement, replaces those cutting tools and resets those pointers 14 to their limit positions as determined by the original setting of arms 18. Upon such resetting, none of the tool condition indicating mechanisms is at its zero position so that all of the contacts TL1Aa to TL6Aa are again closed, operating relay CRTL to extinguish signal 228 and to close contacts CRTLa to again enable the machine tool control equipment MC.

To minimize the total shut-down time, it has been found to be advantageous to replace certain of the tools prematurely at the time that the machine tool is shut down due to any one or more of the cutting tools reaching the prescribed degree of dullness. To facilitate this operation, it is desirable to color code or otherwise characterize a portion of the dial 12 of each of the tool condition indicating mechanisms. In the view of Fig. 1, a portion 230 of the periphery of dial 12 is shaded, including the first indication other than zero, that is, the indication marked 12 in the illustrated example. Under that condition, if the machine tool is shut down due to some other one of the tool condition indicating mechanisms reaching zero, the operator will be directed to replace the cutting tool individual to the mechanism illustrated in Fig. 1 if the pointer 14 is pointing at the numeral 12, so that the cutting tool will be replaced even though it could be used for 12 additional machine cycles without reaching the prescribed degree of dullness. To further minimize the extent of tool shut down, the shaded area 230 may be expanded to include, for example, the indicia 24 so that if pointer 14 is pointing either at 24 or 12 at the time the machine tool is shut down by another machine tool indicating mechanism, the operator will be apprised that the cutting tool associated with the illustrated mechanism should also be replaced.

While it will be apparent that the embodiments of the invention herein disclosed are well calculated to fulfill the objects of the invention, it will be appreciated that the invention is susceptible to modification, variation and change without departing from the proper scope or fair meaning of the claims.

What is claimed is:

1. In a system for association with an electrically controlled cyclically operable machine tool having a plurality of cutting tools which become dull after different numbers of cycles operation of the machine tool and having a signaling device actuatable once each machine cycle for producing an output pulse each machine cycle, a tool condition indicating mechanism for each of at least certain of the cutting tools, each of said mechanisms including movable means and electrical means effective at each pulse of electrical energy applied thereto to shift said movable means one increment, and pulsing means controlled by the signaling device for applying pulses of electrical energy to different ones of said electrical means at each completion of different preselected pluralities of cycles of operation of the machine tool, said pulsing means comprising a plurality of stepping means each of which is effective to produce a pulse of electrical energy in response to a plurality of electrical pulses applied thereto and each of which includes movable means and electrical means effective at each pulse of electrical energy applied thereto to shift the associated movable means one increment, means controlled by said signalling device for applying a pulse of electrical energy to the said electrical means of one of said stepping means at each cycle of operation of the machine tool, and means including said movable means of said one stepping means connected to the electrical means of another one of said stepping means for applying a pulse of electrical energy to said electrical means of said other one of said stepping means at each completion of a preselected plurality of cycles of operation of the machine tool.

2. In a system for association with an electrically controlled cyclically operable machine tool having a plurality of cutting tools which become dull after different numbers of cycles of operation of the machine tool and having a signaling device actuatable once each machine cycle for producing an output pulse each machine cycle, a tool condition indicating mechanism for each of at least certain of the cutting tools, each of said mechanisms including movable means and electrical means effective at each pulse of electrical energy applied thereto to shift said movable means one increment, and pulsing means controlled by the signaling device for applying pulses of electrical energy to different ones of said electrical means at each completion of different preselected pluralities of cycles of operation of the machine tool, said pulsing means comprising a plurality of stepping means each of which is effective to produce a pulse of electrical energy in response to a plurality of electrical pulses applied thereto, means controlled by said signalling device for applying a pulse of electrical energy to one of said stepping means at each cycle of operation of the machine tool, means including said one stepping means connected to another one of said stepping means for applying a pulse of electrical energy to said other one of said stepping means at each completion of a preselected plurality of cycles of operation of the machine tool, and means including said other one of said stepping means for applying a pulse of electrical energy to a third one of said stepping means at each completion of a different preselected plurality of cycles of operation of the machine tool.

3. In a system for association with an electrically controlled cyclically operable machine tool having a plurality of cutting tools which become dull after different numbers of cycles of operation of the machine tool and having a signaling device actuatable once each machine cycle, a tool condition indicating mechanism for each of at least certain of the cutting tools, each of said mechanisms including movable means and electrical means effective at each pulse of electrical energy applied thereto to shift said movable means one increment, and pulsing means controlled by the signaling device for applying pulses of electrical energy to different ones of said electrical means at each completion of different preselected pluralities of cycles of operation of the machine tool, said pulsing means comprising electrically operated stepping switch means for applying a pulse of electrical energy to one of said mechanisms each preselected number of machine cycles and for applying a pulse of electrical energy to a different one of said mechanisms each different preselected number of machine cycles.

4. In a system for association with an electrically controlled cyclically operable machine tool having a plurality of cutting tools which become dull after different numbers of cycles of operation of the machine tool and having a signaling device actuatable once each machine cycle, a tool condition indicating mechanism for each of at least certain of the cutting tools, each of said mechanisms including movable means and electrical means effective at each pulse of electrical energy applied thereto to shift said movable means one increment, and pulsing means controlled by the signaling device for applying pulses of energy to different ones of said electrical means at each completion of different preselected pluralities of cycles of operation of the machine tool, said pulsing means comprising a plurality of electrically operated stepping means each responsive to input electrical energy pulses, and means including one of said stepping means for applying one electrical energy pulse to a second one of said stepping means each preselected number of cycles of operation of said machine and for applying one electrical energy pulse to a third one of said stepping means each different preselected number of cycles of operation of said machine.

5. In a system for association with an electrically controlled cyclically operable machine tool having a plurality of cutting tools which become dull after different numbers of cycles of operation of the machine tool and having a signaling device actuatable once each machine cycle, a tool condition indicating mechanism for each of at least certain of the cutting tools, each of said mechanisms including movable means and electrical means effective at each pulse of electrical energy applied thereto to shift said movable means one increment, and pulsing means controlled by the signaling device for applying pulses of electrical energy to different ones of said electrical means at each completion of different preselected pluralities of cycles of operation of the machine tool, said pulsing means comprising a plurality of electrically operated stepping means each responsive to input electrical energy pulses, means including one of said stepping means for applying one electrical energy pulse to a second one of said stepping means each preselected number of cycles of operation of said machine and for applying one electrical energy pulse to a third one of said stepping means each different preselected number of cycles of operation of said machine, and means including said third stepping means for applying an electrical energy pulse to one of said electrical means each preselected number of the electrical energy pulses applied to said third stepping means and for applying an electrical energy pulse to another one of said electrical means each different preselected number of the electrical energy pulses applied to said third stepping means.

References Cited in the file of this patent

UNITED STATES PATENTS

| 2,679,038 | Cross et al. | May 18, 1954 |
| 2,735,915 | Hagen | Feb. 21, 1956 |